April 8, 1941.    R. E. LEAVENS    2,237,354
BANANA PEELER
Filed Dec. 7, 1939

Inventor
ROBERT E. LEAVENS

By
E. V. Hardway,
Attorney

Patented Apr. 8, 1941

2,237,354

UNITED STATES PATENT OFFICE 2,237,354

BANANA PEELER

Robert E. Leavens, Houston, Tex.

Application December 7, 1939, Serial No. 307,953

2 Claims. (Cl. 146—5)

This invention relates to a banana peeler and divider.

An object of the invention is to provide an implement of the character described specially designed for peeling and dividing bananas without bringing the peeled fruit into contact with the hand.

The dividing blade is made easily removable for cleansing purposes and so that, if desired, the banana may be peeled and the fruit left whole.

It is another object of the invention to provide an implement of the character described which is very light and which may be, if desired, held in one hand while the banana is manipulated by the other hand to accomplish the peeling and dividing operation; or the implement may be fixed to a table or other stationary support while in use.

With the above and other objects in view, the invention has particular relation to certain novel features of construction, arrangement of parts and use, an example of which is given in this specification and illustrated in the accompanying drawing, wherein.

Figure 1:
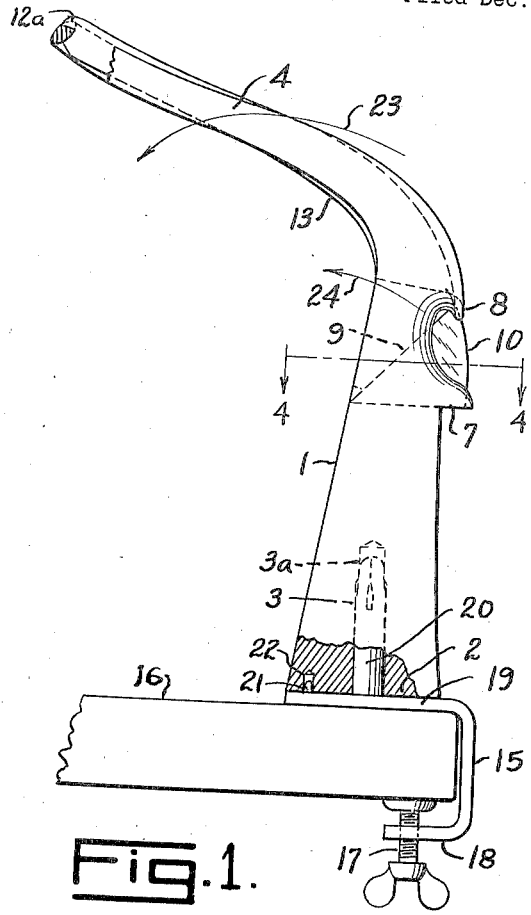
Figure 1 shows a side view of the implement partly in section.
Figure 2:
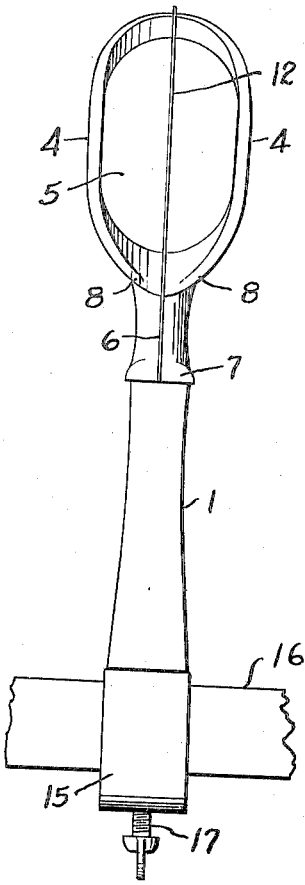
Figure 2 shows a front elevation.
Figure 3:
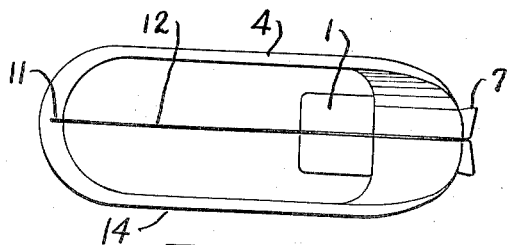
Figure 3 shows a plan view.
Figure 5:
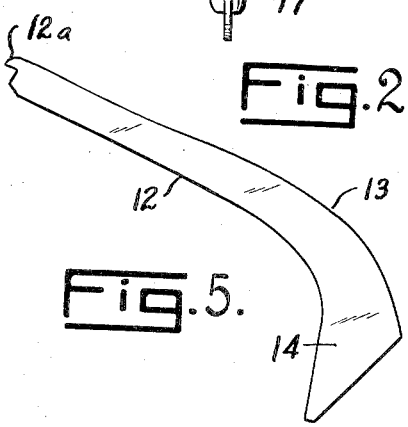
Figure 5 shows a side view of a divider blade.
Figure 4:
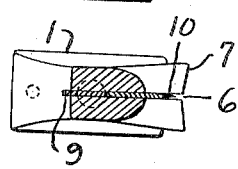
Figure 4 shows a sectional view taken along the line 4—4 of Figure 1.

Referring now more particularly to the drawing, wherein like numerals of reference designate the same parts in each of the figures, the numeral 1 designates the shank of the implement which is preferably square in cross section and is flared toward one end. This last mentioned end is formed with a relatively wide flat base 2 having a deep socket 3 whose inner end 3a is reduced in diameter. The other end of the shank 40 is retracted and formed into an elliptical shape having the relatively thin slightly flexible side bars 4, 4, which are spaced apart providing a passageway 5 through between them for the passage of the peeled fruit.

The upper end of the shank has a slit 6 extending entirely across the same and at the lower end of said slit, the shank has the forward extension 7. The side bars 4 are widened forwardly as clearly illustrated in Figure 1 and their forward margins terminate in the diverging guides 8, 8.

Seated in the slit 6 there is a blade 9 whose forward margin terminates in a cutting edge 10 designed to slit the banana peel at the beginning of the peeling operation. In setting the blade 9 in place, a suitable expander may be employed to slightly spread the side bars 4, 4 to widen the slit 6 and the blade 9 is then inserted in place and the expander removed so that said blade will be firmly gripped and held in place until it is desired to remove and replace the same.

Opposite the slit 6 where the side bars 4 join there is a deep narrow notch 11. A divider blade 12 is employed having the upwardly directed cutting edge 13. One end of this blade is widened as at 14. The blade 9 is substantially triangular in shape, as shown in Figure 1 and the widened end of the blade 12 is shaped to fit closely against the adjacent margin of the blade 9 as also shown in Figure 1, said widened end fitting snugly in the slot 6. The opposite end of the blade 12 has an extension 12a which fits into the notch 11. If it is desired to remove the blade 12 for cleansing its outer end may be lifted out of the notch 11 and its widened end released from the slit 6 and said blade may be easily removed and replaced. If it is not desired to slit the peeled fruit the blade 12 may be left out during peeling operations.

If it be desired to anchor the implement to a table or other support, a bracket 15 may be fitted over a margin of the table as 16 and clamped by means of a clamp screw 17 which is threaded through the lower side bar 18 of the bracket. The top side bar 19 of the bracket has an upstanding dowel 20 whose free end is slitted and when the implement is seated on the side bar 19 with the dowel 20 fully inserted into the socket 3, the reduced portion 3a of said socket will grip the slitted end of the dowel so as to hold the implement firmly in place and the implement is held against turning on the dowel by means of a key 21 which upstands from the bar 19 into the keyway 22 of the shank 1. In use, an end of the banana may be brought into contact with the blade 10 to slit the peel and the banana then moved forwardly following the direction of the arrow 23, Figure 1. The peeled fruit will pass through the opening 5 and with the blade 12 in place will be divided into halves. The peel will be separated, passing on each side of the guides 8, following the course indicated by the arrow 24 in Figure 1. The fruit may thus be peeled and prepared for use without coming into contact with the hand.

If it is not desired to anchor the implement to a table or support while using the same it may be held in one hand and the banana manipulated as above described by the other hand.

The drawing and description are illustrative merely while the broad principle of the invention will be defined by the appended claims.

What I claim is:

1. An implement for peeling bananas comprising a shank forming a grip and terminating at one end in an approximately elliptical frame having flexible side bars and having an opening through the frame for the passage of the peeled banana, the forward end of the frame being formed into diverging guide means to guide the peeling, a blade beneath the guide and anchored to the shank and a removable dividing blade extending longitudinally across the opening and whose ends are supported by the corresponding ends of the frame.

2. An implement for peeling bananas comprising a shank forming a support and terminating at one end in an approximately elliptical frame having small thin side bars and having an opening through the frame for the passage of the peeled banana, the forward end of the frame being formed into diverging guide means to guide the peeling, a blade beneath the guide and anchored to the shank and a removable dividing blade extending longitudinally across the opening and whose ends are supported by the corresponding ends of the frame.

ROBERT E. LEAVENS.